United States Patent [19]

Graham

[11] 4,166,255
[45] Aug. 28, 1979

[54] HYBRID CORNEAL CONTACT LENS

[75] Inventor: Robert K. Graham, Escondido, Calif.

[73] Assignee: Minnesota Mining and Manufacturing Company, St. Paul, Minn.

[21] Appl. No.: 695,472

[22] Filed: Jun. 14, 1976

[51] Int. Cl.² ............................................. G02C 7/04
[52] U.S. Cl. ............................ 351/160 H; 351/160 R
[58] Field of Search ........................... 351/160, 160 H

[56] References Cited

U.S. PATENT DOCUMENTS

| 3,488,111 | 1/1970 | Isen | 351/160 |
| 3,619,044 | 11/1971 | Kamath | 351/160 |
| 3,660,545 | 5/1972 | Wichterle | 351/160 X |
| 3,816,160 | 6/1974 | Moore | 350/175 GN |
| 3,916,033 | 10/1975 | Merrill | 351/160 X |
| 3,933,411 | 1/1976 | Winner | 351/160 |
| 3,944,347 | 3/1976 | Barkdoll et al. | 351/160 |
| 3,973,837 | 8/1976 | Page | 351/160 |

FOREIGN PATENT DOCUMENTS

| 2129042 | 12/1972 | Fed. Rep. of Germany | 351/160 H |
| 2309933 | 9/1974 | Fed. Rep. of Germany | 351/160 H |
| 1045065 | 10/1966 | United Kingdom | 351/160 H |

OTHER PUBLICATIONS

Ziegler, J. F., "Fabrication or Correction of Optical Lenses," *IBM Technical Disclosure Bulletin*, Mar. 1970, pp. 1573-1575.
William E. Long, "An Update . . . " *Contacts*, 5/1974, pp. 35-37.
*Optometric Weekly*, p. 14, 8-22-74.

*Primary Examiner*—John K. Corbin
*Assistant Examiner*—Scott J. Sugarman
*Attorney, Agent, or Firm*—Cruzan Alexander; Donald M. Sell; James V. Lilly

[57] ABSTRACT

A hybrid corneal contact lens comprising a substantially rigid central optical area surrounded by and/or embedded in a relatively soft transparent plastic component, and methods of constructing the same, the lens having the unique features of retaining the optical configuration imparted to the central optical portion, yet possessing a flexible feather-edged periphery, thereby providing a safer and more comfortable fit for the eye.

14 Claims, 5 Drawing Figures

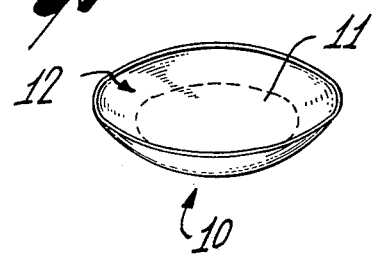
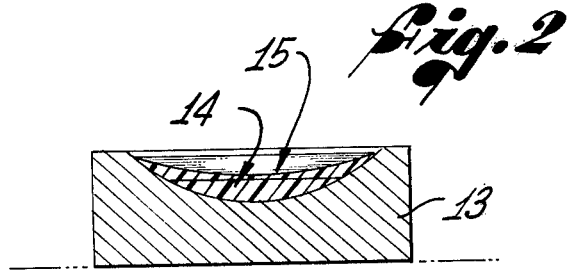
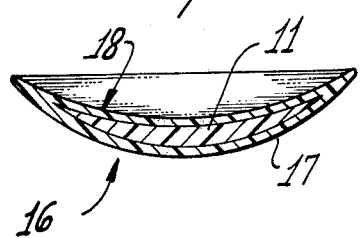
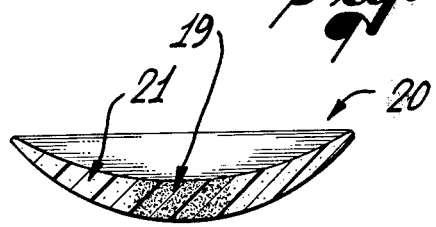
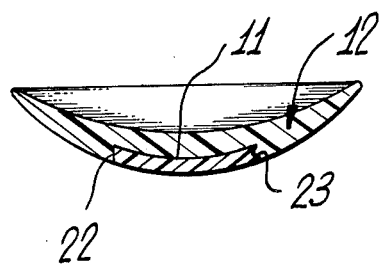

HYBRID CORNEAL CONTACT LENS

BACKGROUND OF THE INVENTION

Contact lenses have gained wide acceptance in correcting many forms of vision deficiencies. These lenses have generally been made of relatively rigid materials such as plastics which are well suited for contact lens use.

However, one of the principal disadvantages of the conventional rigid corneal contact lenses is the discomfort they induce in the upper eyelid lining as the lid slides over the edge of the lens during a blink. Attempts to grind this edge to a thin featheredged configuration has posed the serious danger of laceration of the ocular area.

It was discovered that certain soft materials such as polymeric hydrogels made by polymerizing a catalyzed mixture of acrylates and/or methacrylates of polyhydric alcohols are also well suited for use in preparing contact lenses. See, generally, the disclosure U.S. Pat. No. 2,976,576. This development was a partial solution to the problem of eyelid discomfort to the wearer, whereby the soft texture of the lens enabled the edge to be made thinner and to lie closer to the surface of the eye.

However, a major limitation of the soft lenses is that their flexible nature makes them more subject to physical distortion and, hence, somewhat deficient for the correction of vision and particularly of corneal astigmatism. The flexible character of the soft lens allows the corneal defects to be transmitted through the lens itself. As a consequence, the front surface of the lens does not remain spherical and thereby does not sufficiently correct the wearer's vision.

The improved lens of the present invention, therefore, provides a corneal contact lens which will retain a spherical configuration or other specified shape once imparted to the central optical area, yet possessing a soft, flexible, feather-edged periphery thereby providing optical superiority combined with a safer and more comfortable fit for the eye.

SUMMARY OF THE INVENTION

This invention relates to corneal contact lenses and has particular reference to an improved lens of compound structure. The hybrid lens of this invention comprises a substantially rigid optical element or component surrounded by a relatively soft ophthalmic plastic component, wherein this lens possesses the virtues of a stiffened central optical area with a soft flexible periphery. The rigid optical element or component may be merely surrounded about its peripheral edges by the soft component, may be surrounded on three sides by the soft component, or may be totally enclosed on all sides by the soft component. Preferably, the substantially rigid central element is composed of a polymethylmethacrylate polymer (PMMA). Additionally, the soft flexible periphery of the hybrid lens is preferably composed of 2-hydroxy-ethyl-methacrylate plastic (HEMA).

Various methods of constructing the hybrid contact lens can be utilized under the present invention. These embodied methods include:

(1) a two step polymerization and molding process, comprising an initial pouring and polymerization of the rigid central optical element which may thereafter be ground and polished, and a subsequent pouring and polymerizing of the soft plastic peripheral component surrounding the rigid component;

(2) inserting a preformed rigid central optical component onto the supporting surface of a mold member, preferably female shaped, and thereafter pouring and polymerizing the soft plastic peripheral component surrounding the rigid component;

(3) forming a preliminary soft skin layer of polymeric material onto the supporting surface of a mold member, preferably female shaped, inserting a preformed polished rigid central optical component thereon and subsequently pouring and polymerizing an additional layer of soft flexible polymeric material over the previous components to form an embedded rigid central optical component within a sandwich of relatively soft ophthalmic plastic material;

(4) a first layer of relatively soft plastic material is poured onto the inner surface of a mold member, preferably female shaped, allowing the first layer to partially cure, applying a small quantity of eventually hard plastic monomer mixture onto the first layer so as to enable the hard plastic monomer to diffuse into the first layer, and thereafter curing the hybrid contact lens assembly;

(5) forming a first soft skin layer of polymeric material upon the inner surface of the mold member, preferably female shaped, subsequently forming a lens with a stiffened optical area as described in embodiment (4) above, placing the lens centrally on the afore-mentioned soft skin layer and thereafter pouring and polymerizing an additional layer of soft flexible plastic, so as to form a hard plastic optical component encased within a soft sheath of ophthalmic plastic material.

Thus, the hybrid corneal contact lens of the present invention incorporates the desirable features of a soft lens with the additional virtues of a hard lens. Further, this hybrid lens offers a unique way of achieving correction of most errors of corneal astigmatism, as well as nearsightedness or farsightedness, simultaneously with diminished irritation to the eyelid during a blinking motion. Further, the hybrid lens of the present invention provides for a comfortable insertion onto the ocular surface.

The above and other objects and advantages will become apparent from the following more detailed description of the invention, taken in conjunction with the drawings.

BRIEF DESCRIPTION OF THE DRAWINGS

FIG. 1 shows a perspective view of one form of a hybrid contact lens embodying the features of the present invention;

FIG. 2 is a cross-sectional view showing a female mold member with a hybrid lens blank positioned on the supporting surface thereof;

FIG. 3 is a cross-sectional view of another embodiment of a hybrid contact lens formed in a sandwich-type configuration, in accordance with the invention;

FIG. 4 shows yet another embodiment of a hybrid lens formed in accordance with the invention, wherein the monomer of the rigid central optical area is diffused into the soft polymeric component;

FIG. 5 is a cross-sectional view of still another embodiment of a hybrid lens which incorporates a rigid central optical component having a grooved edge on the right half circumference thereof, and alternatively a simple butt edge as shown on the left side of the lens.

DETAILED DESCRIPTION

Referring now to the drawings, particularly to FIG. 1, there is shown a completed hybrid corneal contact lens 10, in accordance with the present invention, composed of a rigid central optical area or region 11 surrounded by and interfaced with a flexible soft periphery 12. While the shape depicted is of a spherical nature, the hybrid lens is not limited to this configuration. Moreover, the shape of the lens blank may be controlled not only by the size and shape of the mold, but also by the relative position of the axis of rotation in a spin casting operation. Hence, a large variety of lens configurations are possible.

Referring now to FIG. 2 of the drawings, there is shown a female mold member 13 whose chord approximates that of the human cornea, generally less than 17 mm. In the first embodied method, by way of example, a pool of monomer mixture 14, such as methyl methacrylate monomer, is caused to polymerize to a rigid segment, on the inner central surface of the female mold member 13. The quantity of monomer mixture should be sufficient so as to approximately cover, in wear, the normal pupil of the human eye, approximately four to eight millimeters in chord. When this central pool of monomer has sufficiently cured, to a rigid plastic state, a small quantity of a second monomer mixture 15 preferably of a soft ophthalmic plastic such as hydrophilic mono-olefinic monomers mixed with small amounts of diolefinic cross-linking agents, is introduced onto the mold member 13 supporting surface, overlaying the now rigid plastic central optical component. The assembled components 14 and 15 are finally cured in place on the supporting surface of the female mold member 13. If a flat interface between the components 14 and 15 would result in too thick a lens, the interface may be made curved as by spin-casting, molding or grinding or turning and polishing.

An appropriate curvature and chord of the final hybrid corneal contact lens and individual components may be imparted by any known process in the art. These alternative processes include spin casting, plural member molding of the lens as by male and female mold assembly utilizing heat and pressure, or by turning and polishing components and/or completed hybrid lens when the soft polymer is in a dehydrated state. For a more complete disclosure of these techniques, see generally, U.S. Pat. No. 3,660,545 which is incorporated herein by reference.

FIG. 3 represents a second embodied lens configuration of the present invention, generally denoted by the reference numeral 16, which may be described as an encasement of the substantially rigid central optical element 11, within a sheath of flexible, soft polymeric material. In this method, again using the casting apparatus shown in FIG. 2, a thin first layer 17 of soft monomeric mixture is positioned and cured onto the inner surface of the female mold member 13. Thereafter, the rigid central optical component 11 is positioned on the soft skin 17. Subsequently, a final soft monomeric layer 18 is poured and cured surrounding the previously assembled component 11 and soft-flexible layer 17, thus, totally encasing the more rigid central optical component within a sheath of soft flexible polymeric material.

While the aforementioned methods of preparing the two configurations of the hybrid lens refer to pouring of the layers followed by curing, it should be understood that a number of different embodied methods can be employed. These embodied methods include:

(a) pouring and polymerizing the two components sequentially in a single female mold member, as by spin casting, wherein the relatively stiffened central optical component is first formed, and thereafter surrounding the rigid component with the soft ophthalmic plastic component and final curing of the assembly;

(b) inserting a preformed rigid central optical component which may be molded, or ground and polished, preferably meniscus or dish shaped, on the inner surface of a female mold member and thereafter pouring and curing a relatively soft-flexible plastic component thereon;

(c) forming a preliminary soft skin polymeric layer on the inner surface of a female mold member, thereafter forming a rigid central component thereon by insertion of a preformed rigid component or, alternatively, forming the rigid component by a second pouring and curing operation and subsequently casting another layer of soft polymeric material to encase the rigid optical component within a sandwich or sheath of soft polymeric material to thereby form a hybrid corneal contact lens;

(d) forming a first layer of relatively soft polymeric material onto the supporting surface of a female mold member, allowing this layer to partially cure, applying a small quantity of relatively hard plastic monomer, preferably methyl methacrylate monomer (MMA), onto the first layer so as to enable the potentially hard plastic monomer to diffuse into the soft polymeric first layer and thereafter during the assembly to form a hybrid corneal contact lens. As seen in FIG. 4, a hybrid lens 20 formed in accordance with the foregoing embodiment, comprises a diffused rigid central optical area 19, surrounded by the flexible soft peripheral component 21.

(e) a further embodiment would include, first forming a thin skin of soft plastic on the inner surface of a female mold surface, allowing the skin of soft plastic to partially polymerize, applying a lens prepared in accordance with the embodied method (d) as described above, to centrally locate the lens on the surface of the afore-mentioned skin of soft plastic, thereafter forming a final skin of soft plastic on the exposed surface of the assembly, and finally curing the assembly, to thereby totally encase a rigid component within a sheath of soft ophthalmic plastic material.

In the aforementioned sheath or sandwich-type configurations, generally seen in FIG. 3, the substantially rigid central component is encased within the soft polymeric material which permits only the soft hydrophilic plastic to contact the ocular tissue.

Additionally, as seen in FIG. 5, the rigid component 11 of embodied methods (a) through (c) may have a butt edge or end 22, grooved edge or end 23 or otherwise modified edge shape to enhance adhesion characteristics with the soft polymeric material 12.

While the method embodiments herein, list polymethyl-methacrylate (PMMA) and 2-hydroxy-ethyl-methacrylate (HEMA) as preferred materials for the respective rigid and soft components, it will be generally understood that the invention is not limited to the use of these specific plastics. Moreover, other relatively hard substances such as glass, cellulose acetate butyrate, Hydropoly and other gas permeable polymers are suitable for forming the rigid central portion of the hybrid lens. Hydropoly is a trademark of a conventional hard contact lens material to which small amounts of cross-linking agents have been added prior to polymerization. Allyl diglycol carbonate is still another material which might be used to form an exceptionally abrasion-resistant rigid component.

Materials which can be utilized to form the flexible component of the hybrid lens include dimefilcon-A, trademarked Gelflex, various silicones and suitable hydrogels which may be prepared from other hydrophilic mono-olefinic monomers mixed with small amounts of diolefinic cross-linking agents.

Curing of the polymeric substances may be effected by irradiation, such as ultra violet rays, heat treatment and/or addition of cross-linking agents.

The following example is illustrative of the operation of the aforedescribed methods.

EXAMPLE

The spin casting method and apparatus as disclosed in U.S. Pat. No. 3,660,545 was utilized to form a paraboloid hybrid lens blank of approximately 13.5 mm. chord, the radius of curvature of the mold center being of the order of 5.88 mm.

The rigid part of the compound contact lens was independently produced by casting a quantity of methylmethacrylate monomer mixture between two mold members, each of the mold members being ground to impart the appropriate curvature to a surface of the resulting rigid polymerized component. The ocular meniscus obtained of polymethyl-methacrylate was next ground and polished and inserted onto the supporting surface of a female mold member of the aforementioned apparatus.

A sufficient quantity of soft monomer mixture was thereafter introduced overlaying the rigid polymethylmethacrylate central component. A representative mixture of the soft monomer mixture is as follows:

| Soft Monomeric Mixture | Percent By Weight |
|---|---|
| Ethylene glycol MMA | 64.8 |
| Diethylene glycol MMA | 7.056 |
| Ethylene glycol DIMA | 0.144 |
| Water | 20.9 |
| Ammonium per sulfate | 1.1 |
| 2 - Dimethylaminoethyl | 6.0 |

The mold and its contents were rotated during polymerization at about 370 revolutions per minute, the exact speed, of course depending on the curvature desired on the upper surface of the hybrid lens. An operating temperature of 35° C. to 40° C. was maintained to effect curing of the assembly.

There was obtained a shape-retaining polymeric hybrid corneal contact lens having a convex bottom surface conforming to the supporting mold surface and a concave top surface which has approximately the shape of a paraboloid formed by the rotation of the mold about its vertical axis.

The use of poly methyl methacrylate for the rigid component of the compound lens and 2-hydroxy-ethylmethacrylate for the flexible component is preferred due to the proven capacity of these two substances to adhere to one another closely and to produce a highly transparent interface.

However, it should be noted that problems of optical discontinuity at the lateral interface between the edges of the relatively rigid and soft ophthalmic plastics do not pose a limitation on the selection of materials if the hard central component sufficiently covers the pupil of the eye.

The term "element" as used herein, is defined as one of the constituent parts or materials of the hybrid corneal contact lens. The scope of the term is meant to include regions which are formed by diffusion.

Thus, the hybrid corneal contact lens of the present invention has the unique features of retaining a spherical or other desired configuration once imparted to the central optical portion, yet possessing a flexible feather-edged periphery, thereby providing a safe and comfortable fit for the eye.

It will be apparent from the foregoing that, while particular forms of the invention have been illustrated and described, various modifications can be made without departing from the spirit and scope of the invention. Accordingly, it is not intended that the invention be limited except as by the appended claims.

I claim:

1. A hybrid corneal contact lens comprising a substantially rigid central optical element completely encased within a sheath of flexible soft polymeric material, said sheath extending beyond the edge of said central optical element to provide a flexible peripheral area around the edge of said optical element of sufficient size so that said area may lie close to the surface of an eye, wherein said substantially rigid central optical element comprises a rigid material diffused within a relatively soft material having different characteristics than said rigid material.

2. A hybrid corneal contact lens having a relatively soft, flexible area surrounding the periphery of a substantially rigid central optical element, said flexible area comprising soft polymeric material and said rigid central optical element comprising a rigid material diffused within said soft polymeric material.

3. A contact lens as set forth in claim 2, wherein said relatively soft, flexible area is feather-edged.

4. A contact lens as set forth in claim 2, wherein said substantially rigid optical element is composed of a polymeric material.

5. A contact lens as set forth in claim 4, wherein said substantially rigid optical element is composed of gas permeable plastic.

6. A contact lens as set forth in claim 4, wherein said substantially rigid optical element is composed of polymethyl methacrylate.

7. A contact lens as set forth in claim 4, wherein said substantially rigid optical element is composed of cellulose acetate butyrate.

8. A contact lens as set forth in claim 4, wherein said substantially rigid optical element is composed of allyl diglycol carbonate.

9. A contact lens as set forth in claim 2, wherein said relatively soft, flexible area is composed of a linear-linked hydrophilic polymer.

10. A contact lens as set forth in claim 9, wherein said relatively soft, flexible area is composed of 2-hydroxy-ethyl-methacrylate.

11. A contact lens as set forth in claim 6, wherein said relatively soft, flexible area is composed of 2-hydroxy-ethyl-methacrylate.

12. A contact lens as set forth in claim 2, wherein said rigid central optical area has a chord of from 4 to 8 mm., and said hybrid lens has an overall chord of less than 17 mm.

13. A contact lens as set forth in claim 2, wherein said relatively soft, flexible area is composed of a gas-permeable substance.

14. A contact lens as set forth in claim 4, wherein said relatively soft, flexible area is composed of a flexible silicone.

* * * * *

UNITED STATES PATENT AND TRADEMARK OFFICE
CERTIFICATE OF CORRECTION

PATENT NO. : 4,166,255
DATED : August 28, 1979
INVENTOR(S) : Robert K. Graham

It is certified that error appears in the above-identified patent and that said Letters Patent are hereby corrected as shown below:

Col. 3, line 46, insert --the-- between polishing and components;

Col. 4, line 31, "during" should read --curing--.

Signed and Sealed this

Eighteenth Day of December 1979

[SEAL]

Attest:

SIDNEY A. DIAMOND

Attesting Officer    Commissioner of Patents and Trademarks